July 6, 1965  H. ALLEN  3,192,613
VALVE AND METHOD OF INSTALLING SAME
Filed May 16, 1961  2 Sheets-Sheet 1
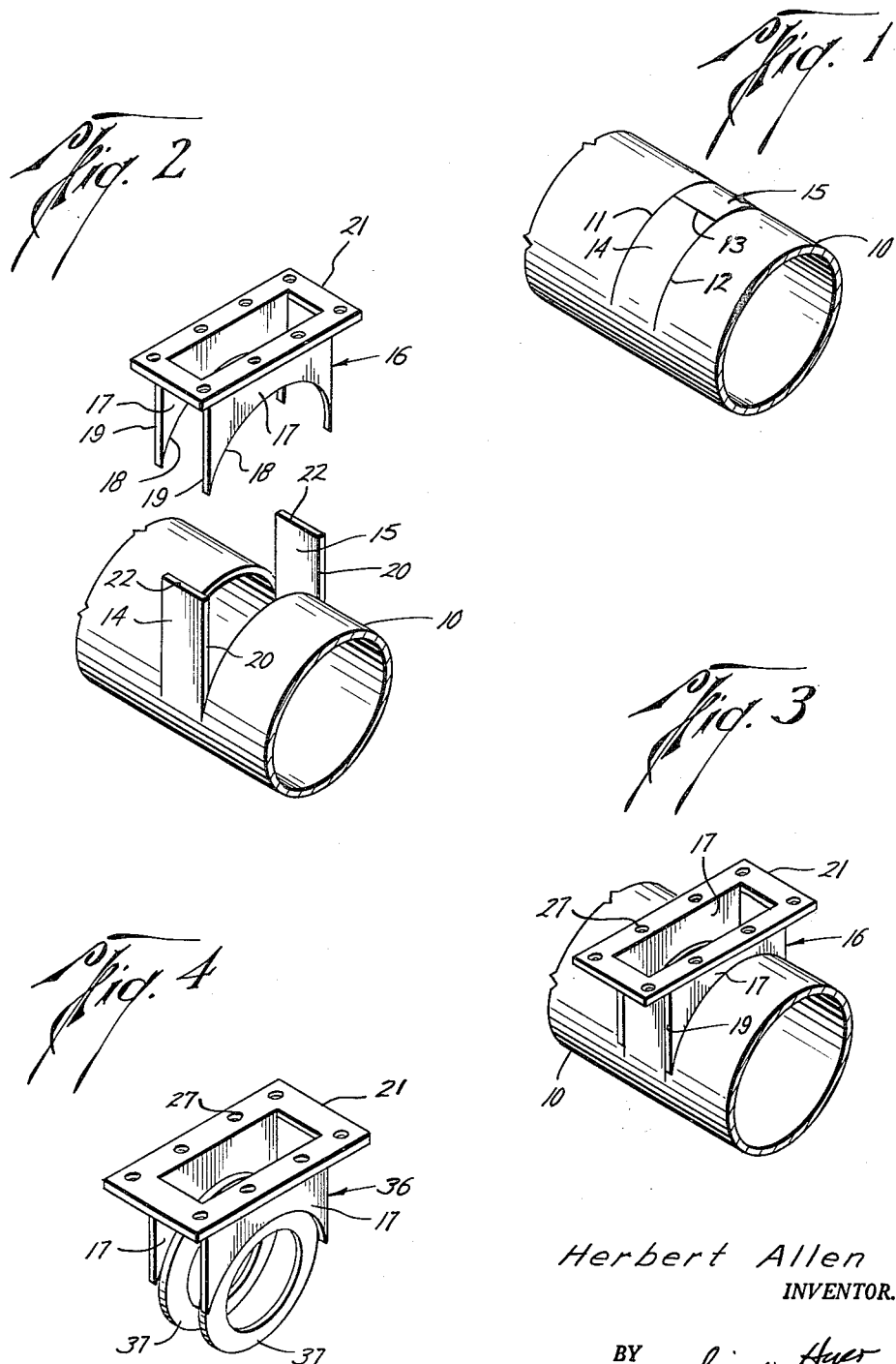
Herbert Allen
INVENTOR.
BY
Browning, Simms, Hyer
& Eickenroht
ATTORNEYS

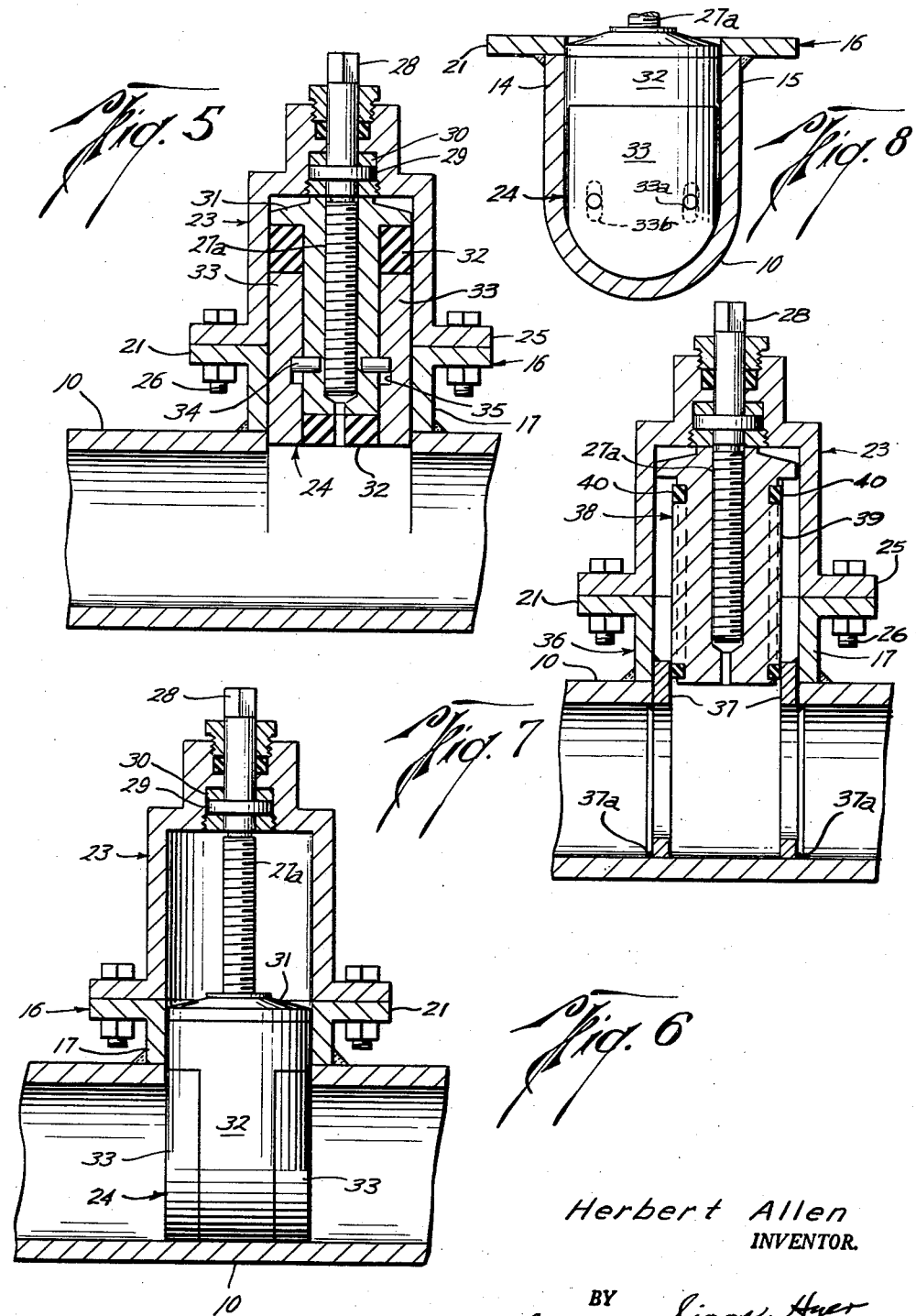

United States Patent Office 3,192,613
Patented July 6, 1965

1

3,192,613
VALVE AND METHOD OF INSTALLING SAME
Herbert Allen, Houston, Tex., assignor to Cameron Iron Works, Inc., Houston, Tex., a corporation of Texas
Filed May 16, 1961, Ser. No. 110,405
2 Claims. (Cl. 29—157.1)

This invention relates to valves for use on pipelines as well as to methods of installing valves on pipelines or other tubular bodies.

Despite other advances in this field, the cost of manufacturing and installing pipelines has remained high. This is due at least in part to the special end preparations for connecting the valves in the pipeline, particularly when the pipe ends are prepared in the field. An object of this invention is to provide a valve and a method of installing same in a pipe which materially lessens this cost. Another object is to provide such a method which does not require the ends of either the pipe or the valve to be specially prepared. A further object is to provide a valve for installation in accordance with this method which is of a simplified construction having a minimum of parts, which may be constructed and installed by unskilled personnel, and which is nevertheless adaptable for use with standard valve parts, such as bonnets and valve members.

These and other objects of the present invention are accomplished, in accordance with the illustrated embodiments of the invention, by the formation of a portion of a pipe into spaced-apart upstanding walls on opposite sides of an opening in the pipe, and the connection of additional walls to the pipe for extension between the upstanding pipe walls to provide a hollow base which connects with the pipe opening. A bonnet is then mounted on the base to support a valve member for movement between positions opening and closing the pipe.

More particularly, the pipe is cut laterally along two spaced-apart semi-circular lines and longitudinally along a line which bisects the semi-circles. Thus, the cut portions may be bent back along diametrically opposed lines which intersect the ends of the lateral cuts to define a space between the upstanding walls and through the base at least equal to the diameter of the pipe.

Preferably, the upstanding walls form interconnected parts of a saddle which has a rectangular flange on the outer edges of such walls to overlie the outer edges of the integral pipe walls when the saddle is assembled on the pipe. The bonnet is supported upon and then bolted to this flange to complete the valve assembly. Thus, a valve constructed in accordance with the present invention requires that only a single part be specially fabricated—namely, the saddle. That is, since the bonnet and valve member are mounted on the saddle in generally the same manner they are connected to conventional valve bodies, they may comprise standard parts from other valves.

In the drawings, wherein like reference characters are used throughout to designate like parts:

FIG. 1 is a perspective view of a portion of a pipe which has been cut laterally and longitudinally in accordance with an initial step of the method of the present invention;

FIG. 2 is a view similar to FIG. 1, but wherein the cut portions of the pipe have been bent back and a specially fabricated saddle is disposed above the cut portions and opening therebetween for lowering into assembled position on the pipe, in accordance with further steps of such method;

2

FIG. 3 is a view similar to FIG. 2, but wherein the saddle has been lowered into assembled position and connected to the pipe in accordance with a still further step;

FIG. 4 is a perspective view of a modified type of saddle;

FIG. 5 is a longitudinal sectional view on an enlarged scale of the pipe and saddle of FIG. 3 with a bonnet and valve member mounted thereon, and with the valve member in open positions;

FIG. 6 is a view similar to FIG. 5, but wherein the valve member is shown in elevation and in closed position;

FIG. 7 is a view similar to FIG. 5, but showing the modified saddle of FIG. 4 connected to the pipe and with the valve member in open position; and FIG. 8 is a cross-sectional view of the valve of FIG. 6, as seen from one side of the closed valve member.

With reference now to the details of the above-described drawings, the pipe 10 may comprise a section of a pipeline in place. Alternatively, it may comprise a separate section of pipe onto which a valve is to be installed in the shop. In either case, and as shown in FIG. 1, the pipe is cut laterally along spaced-apart lines 11 and 12, as well as along a longitudinal line 13 connecting the lateral cuts. As previously described, the lateral cuts 11 and 12 are preferably semi-circular and the longitudinal cut intersects the lateral cuts intermediate their opposite ends. Thus, as shown in FIG. 2, the cut portions 14 and 15 of the pipe may be bent back along lines connecting the ends of the lateral cuts to provide upstanding walls on opposite sides of an opening to the pipe equal in width to the diameter of the pipe. More particularly, the cut portions 14 and 15 are bent back to dispose them parallel to one another so that they define a space between them and form a continuation of the opening in the pipe which is equal to such diameter.

The saddle 16 includes a pair of walls 17 each of which has a lower arcuate edge 18 for fitting the pipe and side edges 19 for disposal adjacent the side edges 20 of the upstanding walls 14 and 15 of the pipeline, as shown in FIG. 3. Thus, the saddle walls are curved along their lower edges to the outer radius of the pipe and are of a width to extend between the upstanding pipe walls 14 and 15. In this manner, when the saddle is lowered into assembled position, the pipe walls and saddle walls provide a hollow rectangular base on the side of the pipeline which forms a continuation of the pipe opening.

More particularly, the side walls 17 of the saddle 16 are of a width at least approximately equal to the outer diameter of the pipe, and are spaced apart a distance equal to the width of the upstanding walls 14 and 15 so that the lower edges 18 of the saddle walls overlap the pipe adjacent the opening therein and the side walls 19 of the saddle walls overlap the side edges of the upstanding pipe walls 14 and 15. Thus, upon connection of the saddle to the pipe including the upstanding walls 14 and 15, as by welding along the adjacent side edges thereof, the base will be enclosed for pressure-tight connection to the bonnet to be described.

Preferably, the saddle 16 includes a rectangular flange 21 on the upper edges of side walls 17 and extending between such edges so as to overlie the upper edges 22 of the upstanding side walls 14 and 15 of the pipe. This flange not only connects the side walls 17 of the saddle together, thereby unifying the assembly, but also provides a support upon which a corresponding flange of a bonnet may be mounted during connection of the bonnet to the saddle. As shown in the drawings, the flange has a rectangular opening therein which forms a continuation of the rectangular opening through the saddle side walls and pipe side walls. Obviously, this flange 21 will be welded to the upper edges 22 of the upstanding side walls 14 and 15 in order to complete the pressure-tight enclosure of the base.

As shown in FIGS. 5 and 6, a bonnet 23 carrying a valve member 24 is mounted above and connected to the saddle 16 to dispose the valve member in position for movement between opened (FIG. 5) and closed (FIG. 6) positions. The bonnet has a flange 25 for seating upon the flange 21 of the saddle and connection thereto by means of bolts 26 which extend through bolt holes 27 in the saddle flange. When the bonnet is so connected, the chamber therein for receiving the valve member in its open position forms a rectangular continuation of the base on the pipeline.

As previously mentioned, this bonnet and valve member may comprise standard parts, such as those shown and described in U.S. Patent No. 2,331,557, except that the valve member 24 is rectangular for sliding closely within the base. This gate is moved between opened and closed positions by means of a non-circular part 28 on its outer end for connection with a suitable tool to rotate same. An enlarged collar 29 on the stem is carried for rotation without longitudinal movement in bearings 30 in the upper end of the bonnet. Thus, upon rotation of the stem in one direction, the valve is caused to move downwardly and across the pipe for closing same as shown in FIG. 6. Upon rotation of the stem in the opposite direction, the gate is caused to move upwardly into the chamber and out of the pipe 10 to open same.

This particular gate includes a central rigid portion 31 having a central threaded opening for connection to the stem 27a and carrying a body 32 of resilient sealing material. This sealing material surrounds a reduced intermediate portion of the body 31 and extends downwardly from both sides thereof and across its lower edge. Additional rigid body portions 33 are carried on each side of the reduced portion of the body portion 31 and beneath and on opposite sides of the integral sealing member 32 for movement longitudinally with respect to the central portion 31. Thus, as shown in FIG. 5, they are carried from the central portion of the body by means of pins 34 which moved within enlarged slots 35 in the side portions 33.

As the gate moves downwardly, and particularly as the lower end of the sealing member 32 and side body portions 33 engage the side of the pipe 10 opposite the opening therein, the sealing member will be compressed and the side body members 33 will be moved upwardly with respect to the central body portion. These side members will thus compress and expand the upper portion of the sealing member to cause it to sealingly engage the side walls of the base. At the same time, the compression of the lower portion of the sealing member about the lower side of the pipe as well as along the upstanding walls 14 and 15 of the saddle will cause it to sealingly engage therewith. Since the sealing member is integral, it therefore forms a continuous seal about the pipe and with the base for the gate to sealingly close off the pipe. As noted in FIG. 8, the body portions 33 may be retained against spreading apart in this closed position by pins 33a anchored thereto at opposite ends and extending through elongated slots 33b in central body portion 31.

The modified form of saddle 36 shown in FIGS. 4 and 7 is assembled upon a pipe 10 prepared in the same manner described in connection with FIGS. 1 and 2. This modified saddle corresponds to the saddle 16, except that it has spaced-apart seat rings 37 carried by the side walls 17 for disposal within and across the pipe 10, as shown in FIG. 7. More particularly, the seat rings 37 are welded to the inside of the side walls 17 so that they move within the opening formed in the pipe by the lateral cuts 11 and 12. The lower edges of the seat rings 37 are curved on a diameter corresponding to the inner diameter of the pipe so as to abut with the side of the pipe 10 opposite the opening therein as the saddle is assembled on the pipe, as shown in FIG. 7.

With the seat rings 37 so disposed, they are welded to the pipe, as shown at 37a, to seal therewith about their circumferences. Alternatively, these seat rings may carry resilient sealing members (not shown) engageable with the pipe, upon assembly of the saddle, so as to provide a seal therewith.

As can be seen from FIG. 7, the bonnet 23 connected to the flange 21 of saddle 36 is identical to that described in connection with FIGS. 5 and 6. The gate 38 may, however, be of more simplified construction since it is adapted to seal against the seat rings 37, rather than across the inside of the pipe 10. Thus the gate 38 merely comprises a solid paddle 39 threadedly connected to the stem 27a for reciprocation and carrying an annular sealing member 40 on each side thereof for sealing engagement with the inner side of a seat ring 37 in the closed position of the gate.

From the foregoing it will be seen that this invention is one adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method of installing a valve on a pipe comprising the steps of cutting the pipe laterally along two spaced-apart semi-circular lines and longitudinally along a line which bisects the lateral cuts, bending back the cut portions on each side of the longitudinal cut along lines intersecting the ends of the lateral cuts and into positions to form an opening in the pipe with upstanding walls on each side thereof having a space therebetween at least equal to the diameter of the pipe, assembling a saddle on the pipe with walls fitting the pipe and extending between the upstanding walls thereof, connecting the saddle to the pipe and the upstanding walls and when so assembled providing a hollow base which forms a continuation of the pipe and the upstanding walls and opening, and mounting a bonnet on the base to support a valve member for movement between positions opening and closing the pipe.

2. A method of installing a valve on a pipe, comprising the steps of cutting the pipe along two spaced-apart, semi-circular and generally parallel lines extending transversely to the axis of the pipe and cutting the pipe along a line extending longitudinally of said axis and bisecting the transverse cuts, bending back the cut portions on each side of the longitudinal cut along lines intersecting the ends of the transverse cuts and into positions to form a rectangular opening in the pipe with upstanding walls on the opposite sides thereof which are spaced apart a distance at least equal to the diameter of the pipe, mounting a saddle on the pipe with walls fitting the pipe and extending between the upstanding walls thereof, connecting the saddle to the pipe and the upstanding walls and when so assembled providing a hollow rectangular base which forms a continuation of the rectangular pipe opening, and mounting a bonnet on the base and a valve member on the bonnet having a rectangular cross section corresponding to that of the hollow base and pipe opening for movement between positions opening and closing the pipe.

(References on following page)

References Cited by the Examiner

UNITED STATES PATENTS

| | | | |
|---|---|---|---|
| 869,340 | 10/07 | Walworth | 29—157 |
| 982,036 | 1/11 | Collar | 251—326 |
| 1,039,340 | 9/12 | Weitzel | 251—326 |
| 1,370,224 | 3/21 | Redding | 29—157.1 |
| 1,860,346 | 5/32 | Anderson | 29—157 X |
| 2,122,957 | 7/38 | Santamaria | 29—157.1 |
| 2,676,604 | 4/54 | Senna | 251—367 |
| 2,869,221 | 1/59 | Siepmann | 29—157.1 |

FOREIGN PATENTS

| | | |
|---|---|---|
| 1,005,913 | 1/52 | France. |
| 503,196 | 7/30 | Germany. |

WHITMORE A. WILTZ, *Primary Examiner.*

ISADOR WEIL, *Examiner.*